United States Patent [19]

Glover et al.

[11] Patent Number: 4,628,078

[45] Date of Patent: Dec. 9, 1986

[54] ACRYLAMIDE-DIALKYLAMINOACRYLATE-DIALKYLAMINOMETHACRYLATE CATIONIC POLYELECTROLYTES AND THEIR PRODUCTION

[75] Inventors: Rodney Glover, Heckmondwike; Martin R. Brown, Liversedge, both of United Kingdom

[73] Assignee: Allied Colloids Ltd., England

[21] Appl. No.: 743,759

[22] Filed: Jun. 12, 1985

[30] Foreign Application Priority Data

Jun. 12, 1984 [GB] United Kingdom ............... 8414950

[51] Int. Cl.[4] ..................... C08F 20/60; C08F 120/60; C08F 220/60
[52] U.S. Cl. .............................. 526/303.1; 526/307.3; 524/745; 524/773; 524/796
[58] Field of Search ......................... 526/307.3, 303.1; 524/745, 773, 796

[56] References Cited

U.S. PATENT DOCUMENTS 4,319,013  3/1982  Cabestany et al. ................ 526/207
4,396,752  8/1983  Cabestany et al. ................ 526/287

FOREIGN PATENT DOCUMENTS 2134531  8/1984  United Kingdom ............ 526/307.3

*Primary Examiner*—Joseph L. Schofer
*Assistant Examiner*—Peter F. Kulkosky
*Attorney, Agent, or Firm*—Ostrolenk, Faber, Gerb & Soffen

[57] ABSTRACT

Improved performance and physical properties are obtainable from acrylamide-dialkylaminoalkyl acrylate polymers when the polymers are made by using a blend of at least about 15% dialkylaminoalkyl acrylate acid addition or quaternary ammonium salt with dialkylaminoalkyl methacrylate acid addition or quaternary ammonium salt.

12 Claims, No Drawings

ACRYLAMIDE-DIALKYLAMINOACRYLATE-DIALKYLAMINOMETHACRYLATE CATIONIC POLYELECTROLYTES AND THEIR PRODUCTION

Cationic polyelectrolytes that are high molecular weight water soluble copolymers of acrylamide with a cationic ester are well known for use as, for instance, flocculants, aqueous thickeners and retention aids in paper manufacture.

Most literature disclosures of such copolymers mention that the comonomer can be quaternised or salified dialkylaminoalkyl acrylate or dialkylaminoalkyl methacrylate and such disclosures are then generally exemplified by copolymers of acrylamide with quaternised or salified dialkylaminoalkyl methacrylate. Such copolymers have been widely used commercially. Certain copolymers of acrylamide with quaternised or salified dialkylaminoalkyl acrylate have also been used.

In U.S. Pat. Nos. 4,319,013 and 4,396,752, powdered copolymers of acrylamide with quaternised or salified dimethylaminoethyl acrylate are described. It is stated that the described copolymers have the cationic units spaced regularly along the chain, and that this is the result of the reactivity ratios $r_1$ and $r_2$ for the monomer pairs from which the copolymers are obtained. Accordingly the use of the acrylate comonomer, rather than the methacrylate comonomer, is stated to give a more regular distribution of cationic units.

It is stated that the defined copolymers of acrylamide and dimethylaminoethyl acrylate have a very distinct superiority as flocculants compared to copolymers of dimethylaminoethyl methacrylate.

The present position therefore is that acrylamide copolymers with cationic methacrylate as the sole comonomer are widely described and used, acrylamide copolymers with cationic acrylate as the sole comonomer have been widely used, and the quoted literature states clearly that powdered copolymers with cationic acrylate are better than the powdered copolymers with cationic methacrylate, and advances theoretical reasons associated with reaction rates of the various monomers for this.

Despite the different reaction rates of the cationic methacrylate ester monomer and the cationic acrylate ester monomer and despite the statements in the literature we have now surprisingly found that improved properties are obtained if the polymer is a terpolymer of acrylamide with both acrylate and methacrylate cationic units in a molar ratio of at least about 15:85.

Novel cationic polyelectrolytes are terpolymers of (a) dialkylaminoalkyl acrylate, (b) dialkylaminoalkyl methacrylate and (c) acrylamide and are in the form of acid addition or quaternary ammonium salts and the molar ratio a:b is from about 15:85 to about 99:5.

These novel terpolymers can be made by conventional polymerisation techniques on the monomers while in free base form followed by conversion to the acid addition or quaternary ammonium salt after polymerisation but preferably are made by polymerisation in aqueous solution of the monomers in salt form.

A process according to the invention for making improved cationic polyelectrolytes comprises polymerising a blend of (a) dialkylaminoalkyl acrylate as acid addition or quaternary ammonium salt, (b) dialkylaminoalkyl methacrylate as acid addition or quaternary ammonium salt and (c) acrylamide whilst in aqueous solution to form an aqueous gel, and then if desired drying the resultant gel, preferably to form a powder, and the molar ratio a:b is from about 15:85 to about 99:5. Thus even though the reaction rates during this process would, according to U.S. Pat. No. 4,319,013, give a non-random polymer, in fact we find the resultant terpolymer has great advantages compared to the comonomers that have previously been described and used.

One advantage obtainable by the invention is that a terpolymer is, in general, more effective (at a given molecular weight) as a flocculant than either corresponding copolymer. By the invention, it is possible, under otherwise similar polymerisation conditions, generally to obtain an increased molecular weight, especially compared to the comonomer of a and c. The polymers are preferably made by bead polymerisation and the invention then has the great advantage that the blends of cationic monomers, even when one monomer is present in a small amount, results in the production of beads having less irregularity in shape and/or size, especially compared to the copolymers of a and c.

Within this specification, we use the term copolymer to refer to polymers made from two monomer types, a and c or b and c, and the term terpolymer to describe copolymers made from three monomer types a, b and c. These terpolymers are generally formed from only the three specified types of monomer and generally are formed from acrylamide and one methacrylate and one acrylate monomer. However, if desired, blends of the methacrylate (type b) or of the acrylate (type a) may be used and in some instances an additional type of comonomer can be included in small amounts, for instance up to 10% based on total copolymer, provided such additional comonomer or monomers does not detrimentally affect the properties of the product. Such other comonomers can be cationic but are generally non-ionic and will preferably be monoethylenically unsaturated monomers.

In eachof the monomers a and b, the alkyl groups carried by the amino group preferably contain 1 to 4 carbon atoms and most preferably are methyl or ethyl. Generally both alkyl groups are the same. The alkylene group preferably contains 2 to 4 carbon atoms and most preferably is ethylene. Any of these groups may be substituted, for instance by hydroxyl. The preferred monomers are diethylaminoethyl acrylate or methacrylate or, in particular, dimethylaminoethyl acrylate or methacrylate.

The acid addition salt or quaternary ammonium salt can be provided by any of the conventional salt-forming groups. For instance, an acid addition salt can be formed with hydrochloric acid or other inorganic acid whilst a quaternary addition salt can be formed with dimethyl sulphate or methyl chloride or other quaternising compounds.

It is generally preferred for the polymers to be made as powders, since the powdered terpolymers appear to exhibit greater general improvement in flocculation performance over the corresponding copolymers than exists when the terpolymers and copolymers are in liquid form.

The production of powdered terpolymers can be conducted whilst the aqueous solution is in bulk, i.e., as a conventional aqueous gel polymerisation, followed by comminution and drying of the resultant gel mass to form the desired powder. For instance, the polymerisation may be conducted to form a stiff gel which may then be comminuted to large particles which may then be dried, further comminuted and further dried, all in conventional manner.

Preferably, however, the production of powdered terpolymers is conducted as a reverse phase bead polymerization process. Thus the polymerization is conducted whilst the aqueous solution of monomers is dispersed in a water immiscible liquid. This results in the production of a dispersion of gel particles in the liquid and this dispersion is dried, for instance as a result of azeotropic distillation, and the particles are separated from the dispersion, for instance by centrifuging or filtering. The separated particles may be further dried.

Reverse phase bead polymerisation processes are well known for instance from U.S. Pat. No. 2,982,749. Typically, the aqueous monomer solution is stirred into the non-aqueous liquid in the presence of a polymeric stabiliser to form aqueous monomer beads of the desired size, and polymerisation is then initiated. The size of the resultant polymer particles, when dry, is preferably dictacted by the size of the dispersed aqueous monomer particles and this in turn is affected by the conditions under which the particles are formed, and in particular by the amount of shear that is applied and by the presence or absence of a surfactant. Surfactant may be used, for instance as in U.S. Pat. No. 4,319,013 in order to obtain smaller particles but if larger particles are desired then it can usually be omitted.

Suitable polymeric stabilisers, water immiscible liquids and other polymerisation conditions are described in the literature, for instance in European patent specification No. 0126528.

The process conditions used in the invention are generally such that the dry particles have a size of at least 10 microns and usually at least 50, and preferably at least 100, microns. The maximum size is generally below 3 mm with preferred products consisting mainly of particles in the range 200 microns to 1 mm, or sometimes up to 2 mm.

The terpolymer beads obtained in the invention can have a more regular shape and/or size than the corresponding copolymer beads, especially compared to copolymers of a and c. Thus a difficulty with the known processes is that there is a tendency for the beads to have an irregular shape and/or an irregular particle size. The ideal product would consist of substantially spherical beads having a narrow range of particle sizes. Unfortunately, we have found that when a copolymer of acrylamide and dialkylaminoalkyl acrylate is formed by conventional reverse phase bead polymerization there is a particularly marked tendency for the beads to be of irregular shape and/or irregular size, and in particular there can be a significant proportion of dusting.

We have surprisingly found that the replacement of some of the cationic acrylate ester by catonic methacrylate ester reduces this tendency to dusting and improves the regularity of bead shape or bead size or both. There is generally no advantage in using more than 25% methacrylate, based on the molar amount of acrylate and methacrylate ester.

If a liquid grade of terpolymer is required, it is preferably produced by polymerization the aqueous solution while dispersed in a water immiscible liquid to produce a stable dispersion of aqueous polymer gel particles in the water immiscible liquid, i.e. by a reverse phase suspension or emulsion polymerisation process conducted to give a very small particle size, e.g. 0.1 to 3 microns. Such processes are described in, e.g. EP No. 0126528. The dispersion may be dried by azeotropic distillation to give a dispersion of dry polymer particles in water immiscible liquid.

All processes used in the invention generally require polymerisation of a solution containing 20 to 60%, generally 25 to 40%, by weight monomer, in the presence of an initiator (usually redox or thermal) until the polymerization terminates. The temperature generally starts low, e.g. 0° to 30° C. but may rise to, e.g. 40° to 95° C.

The molar proportion of acrylamide, based on the molar amount of acrylamide, dialkylaminoalkyl acrylate and dialkylaminoalkyl methacrylate, is generally from 99 to 20%. Preferably, the amount of acrylamide is at least 50%, often at least 60%. Often it is below 95%. All percentages herein are molar, unless otherwise specified.

The ratio of monomer a:monomer b used in the process of the invention, and thus the ratio of groups a and b in the final polymer, on a molar basis is preferably about 80:20 to about 20:80.

In one class of processes, the ratio is about 5:95 to 50:50, i.e., the cationic monomer is mainly methacrylate. In these processes, the ratio is generally 40:60 to 5:95 with best results generally being achieved in the range 25:75 to 5:95. For instance replacement of 8 to 22%, preferably 10 to 20% of the methacrylate by acrylate gives a significant improvement in flocculation performance properties and very good results are obtained when the ratio is below 12:88, preferably below 15:85.

In another class of processes, the ratio a:b is from about 50:50 to about 85:15, the cationic monomers being mainly acrylate. Preferably the ratio a:b is about 60:40 to 85:15, most preferably about 75:25 to 85:15. This can lead to improved flocculation performance properties and to increased molecular weight, as well as to improved bead size and shape.

Although the invention is of particular value when up to about 25%, for instance up to 20 or 22%, of type a or type b monomer is to be replaced by type b or type a monomer respectively valuable performance results are also obtainable when the ratio a:b is in the range 70:30 to 30:70, most preferably 40:60 to 60:40.

The polymerisation is preferably conducted under known conditions such that the polymers are water soluble and have a high molecular weight, generally above 1 million, for instance up to 30 million. The intrinsic viscosity, measured in molar sodium chloride solution at 25° C., is generally above 6, for instance from 8 to 14.

Although the polymers can be used for any of the purposes of which such high molecular weight cationic polyelectrolytes are suitable, the invention is of particular value when applied to the production of flocculants and so the invention includes also processes in which aqueous dispersions are flocculated by adding to the dispersion, in known manner, one of the flocculants produced in accordance with the invention.

The following are some examples.

EXAMPLE 1

An aqueous solution of 38 mole % methyl chloride quaternised dimethylaminoethyl acrylate (A) and/or methacrylate (B) 62 mole % acrylamide was prepared having a pH of around 4 and was dispersed in a nonaqueous liquid consisting of a blend of solvent 41 (95% by weight) and perchlorethylene (5% by weight) in the presence of 0.2% by weight of a suitable amphipathic polymeric stabilizer, for instance stabilizer as described in British Pat. No. 1482515 or U.S. Pat. No. 4,158,726. The dispersion of the aqueous solution into the non-aqueous liquid was conducted by conventional stirring equipment with sufficient agitation to give beads about 0.75 mm in diameter. Polymerisation was then initiated in conventional manner using potassium bromate and sulphur dioxide. The reverse phase bead polymerisation was allowed to go to completion in conventional manner, the water was removed by azeotroping the resultant product and the substantially dry beads were then separated from the non-aqueous liquid by centrifuging.

Each preparation was evaluated as a dewatering acid using a digested sewage sludge, to which 0.3 moles of sodium chloride had been added, as test substrate. Dewaterability was measured in terms of CST (capilliary suction time).

From CST values obtained at each of two dose levels, a performance index, relative to the performance of the copolymer prepared from 100% A was calculated for each preparation.

Where the CST using the 100% A preparation is X and that obtained for the other preparation is Y:

$$\text{Performance Index} = \frac{(x-y)}{x} \cdot 100$$

Preparations were grouped according to cationic monomer/mixed cationic monomer with there being between 1 and 10 preparations within each group. The average intrinsic viscosity (IV) in dl/g and performance index (PI) was calculated for each group. Performance index was then corrected for variation in molecular weight by multiplying each value by a ratio of highest IV:IV of preparation under consideration. Results were as follows:

| Ratio of A:B | Average IV | PI | Corrected PI |
| --- | --- | --- | --- |
| 100:0 | 6.7 | 0 | 0 |
| 89:11 | 7.3 | 13 | 16 |
| 74:26 | 8.1 | 40 | 43 |
| 48:52 | 8.0 | 39 | 42 |
| 38:62 | 7.5 | 41 | 48 |
| 29:71 | 6.4 | 17 | 23 |
| 24:76 | 8.7 | 40 | 40 |
| 19:81 | 6.9 | 29 | 36 |
| 0:100 | 7.2 | −11 | −10 |

EXAMPLE 2

A range of copolymers was prepared by gel polymerisation using 93 mole % acrylamide and 7 mole % cationic monomers. The cationic monomers were as described in Example 1 and designated A and B. The gel polymerisation was conducted on a 29% solution in water of the monomer blend in the presence of 10 ppm potassium bromate, 25 ppm sodium sulphate and 100 ppm azdn. The reaction was initiated at 0° C. and the temperature rose to 92° C. before the reaction terminated. The gel was cooled, minced, dried at 40° C. and ground to powder.

Each preparation was evaluated as a dewatering aid for sewage sludge, to which 0.3 moles of sodium chloride had been added. Performance indices and corrected performances indices were obtained and calculated as described in Example 1, whilst using the first product of this series of single products as reference.

| Ratio of A:B | I.V. | P.I. | Corrected P.I. |
| --- | --- | --- | --- |
| 0:100 | 5.3 | 0 | 0 |
| 9.4:90.6 | 5.8 | 10 | 18 |
| 23.7:76.3 | 8.7 | 29 | 35 |
| 48.3:51.7 | 9.3 | 29 | 32 |
| 73.7:26.3 | 10.3 | 34 | 34 |
| 89.4:10.6 | 10.4 | 41 | 41 |
| 100:0 | 9.9 | 28 | 29 |

EXAMPLE 3

Two copolymers of 78.5 mole % acrylamide and 21.5 mole % cationic monomers, were prepared, by reverse phase polymerisation followed by azeotropic distillation, at similar I.V. The cationic monomers were as described in Example 1 and designated A and B. The polymerisation conditions were similar to those described in Example 1 except that sufficient sorbitan mono-oleate was added to give a stable dispersion, after drying, of particles mainly below 2 microns in size dispersed in oil.

Each preparation was evaluated on sewage sludge to which 0.5 moles of sodium chloride had been added. A performance index was calculated as described in Example 4 using the product prepared from 100 mole % dimethylaminoethyl acrylate methyl chloride quaternary salt as the reference

| Ratio A:B | I.V. | P.I. |
| --- | --- | --- |
| 100:0 | 6.7 | 0 |
| 89.4:10.6 | 7.0 | 20 |

We claim:

1. A high molecular weight cationic polyelectrolyte formed from acrylamide and cationic monomer characterized in that the polymer is a terpolymer of (a) dialkylaminoalkyl acrylate acid addition or quaternary ammonium salt with (b) dialkylaminoalkyl methacrylate acid addition or quaternary ammonium salt and (c) acrylamide, in which the molar ratio a:b is about 88:15 to about 5:95 and in which the molar amount of acrylamide based on the total molar amount of (A), (B) and (C) is 20 to 99%.

2. A polymer according to claim 1 in which the amount of c in the terpolymer is about 50 to about 90% molar.

3. A polymer according to claim 1 in which the ratio a:b is about 80:20 to about 20:80.

4. A polymer according to claims 1 in which the molar ratio a:b is about 60:40 to about 85:15.

5. A polymer according to claim 1 in which monomer a is dialkylaminoethyl acrylate acid addition or quaternary ammonium salt and monomer b is dialkylaminoethyl methacrylate acid addition or quaternary ammonium salt.

6. A polymer according to claim 1 which is a flocculant and has intrinsic viscosity greater than 6.

7. A polymer according to claim 1 in the form of a powder.

8. A polymer according to claim 1 in which the alkyl groups have 1 to 4 carbon atoms.

9. A polymer according to claim 8 in which the alkyl groups are methyl.

10. A polymer according to claim 8 in which the salt is methyl chloride quaternary ammonium salt.

11. A polymer according to claim 9 wherein the salt is dimethyl sulfate quaternary ammonium salt.

12. A polymer according to claim 8 in which the alkyl groups are ethyl.

* * * * *